Patented Dec. 31, 1935

2,025,921

UNITED STATES PATENT OFFICE 2,025,921

ANTHRAPYRIDONE SULPHONIC ACID AND PROCESS OF MAKING THE SAME

Klaus Weinand, Leverkusen-I. G. Werk, Germany, assignor to General Aniline Works, Inc., New York, N. Y., a corporation of Delaware No Drawing. Application August 24, 1933, Serial No. 686,657. In Germany November 14, 1931

4 Claims. (Cl. 260—42)

The present invention relates to a process of preparing anthrapyridone- and anthrapyrimidone sulphonic acids and to the new products obtainable by said process.

In accordance with the invention anthrapyridone- and anthrapyrimidone sulphonic acids are prepared by reacting with a neutral sulphite upon a compound of the probable formula:—

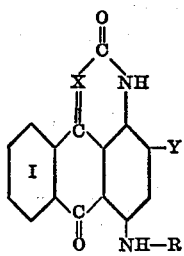

wherein Y means halogen, such as chlorine or bromine, X stands for nitrogen, the group $$-CH, -C-CN, -C-COOR_1$$
$$\phantom{-CH,\ }\|\phantom{-CN,\ }\|$$

($R_1$=alkyl, such as methyl, ethyl, propyl, isopropyl, butyl etc.) R means an unsubstituted or substituted alkyl-, phenyl-, benzyl-, or hydroaryl group and wherein, furthermore, the nucleus marked I may be substituted by monovalent substituents, such as alkyl groups (methyl or ethyl, for example) halogen atoms, (chlorine or bromine), hydroxy-, alkoxy- or sulphonic acid groups etc.

Suitable neutral sufllphites for performing the reaction are, for example, sodium- or another alkali metal sulphite, methylamine sulphite, ethylamine sulphite etc.

Examples of groups which may stand for R are, for instance, methyl, ethyl, propyl, isopropyl, butyl, phenyl, chloro- or bromophenyl, methyl- or ethylphenyl, cyclohexylphenyl, diphenyl, hydroxyphenyl, methoxy- or ethoxyphenyl or other alkoxyphenyls, benzyl, hexahydrophenyl, hexahydromethyl- or ethylphenyl, tetrahydronaphthyl, decahydronaphthyl etc.

The reaction is performed while heating the reaction components, advantageously to a temperature between about 130 and about 180° C., in the presence of a solvent which is inert to the starting materials, but capable of dissolving both of them. Suitable solvents are, for example, phenol, methyl- or ethylalcohol, pyridine or mixtures of these solvents with water etc. The reaction is finished, as soon as water-insoluble anthrapyridone or -pyrimidone derivative is no longer present in the reaction mixture.

The compounds thus obtainable correspond in their free form to the probable general formula:—

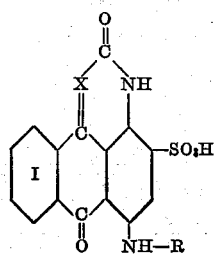

wherein the littera are to be explained as mentioned above and wherein the nuclei may be substituted by monovalent substituents.

They form red to blue crystals, soluble in water with the same coloration, in strong sulphuric acid with a yellow to red coloration. They dye wool from an acid bath clear and even red to violet shades of good fastness properties.

The following examples illustrate the invention, without, however, restricting it thereto, the parts being by weight:—

Example 1

20 parts of 4-anilido-2-chloro-1,9-anthrapyridone (prepared from 2,4-dichloro-1,9-anthrapyridone and aniline) and 20 parts of sodium sulphite are introduced into 200 parts of alcohol or pyridine and 200 parts of water and heated to 160–180° C. in an autoclave for 8–10 hours. When the reaction is complete, the alcohol is distilled off with steam and the 4-anilido-1,9-anthrapyridone-2-sulphonic acid formed is separated in the form of red needles from the red aqueous solution by means of sodium chloride. The dyestuff dyes wool reddish violet from an acid bath.

Instead of the anilidoanthrapyridone derivative mentioned in this example, the corresponding m- or p-toluido compounds may be applied with a similar result.

Example 2

20 parts of 4-anilido-2-bromo-1,9-anthrapyridone (prepared from 2,4-dibromo-1,9-anthrapyridone and aniline), 20 parts of sodium sulphite, 20 parts of phenol and 200 parts of water are heated to 130° C. in an autoclave for 6 hours. After cooling, 50 parts of 30° Bé. caustic soda solution are added to the red solution, whereupon the sulphonic acid formed separates in needles. The product is identical with that obtained in accordance with Example 1.

Instead of the 4-anilido-2-bromo-1,9-anthrapyridone, 4-meta-chloroanilido-, or 4-tetrahydro-beta-naphthylamino-, or 4-hexahydroanilido-2-bromo-1,9-anthrapyridone can be converted into the corresponding 2-sulphonic acids by the method described in the above example.

Example 3

20 parts of 4-anilido-2-bromo-1,9-anthrapyridone (see Example 2) are dissolved in 100 parts of phenol and a solution of 10 parts of sodium sulphite in 10 parts of water is added. The whole is then boiled under a reflux condenser, until the anthrapyridone has become soluble in water. The working up is then performed as described in Example 2.

A similar dyestuff is obtained by replacing in this example the 4-anilido-2-bromo-1,9-anthrapyridone by 4-benzylamino-2-bromo 1,9-anthrapyridone or by 4 - methylamino - 2 - bromo-1,9-anthrapyridone (obtainable by reacting with methylamine upon 4-methoxy-2-bromo-1.9-anthrapyridone).

Example 4

20 parts of 4-anilido-2-bromo-1,9-(C)-carbethoxy-anthrapyridone (obtainable by condensing 1 - amino-2-bromo-4-anilido - anthraquinone with ethyl malonate) are converted into the corresponding sulphonic acid according to the directions of Example 2. This sulphonic acid dyes wool bluer shades than the dyestuff obtained in accordance with Example 2.

A similar dyestuff is obtained from 4-anilido-2-bromo-1,9-(C)-cyanoanthrapyridone by the method described in Example 2.

Example 5

20 parts of 4-anilido-2-bromo-1,9-anthrapyrimidone (obtained from 1-amino-2-bromo-4-anilido-anthraquinone by condensation with urea), 2 parts of potassium sulphite, 20 parts of phenol and 200 parts of water are heated to 140° C. in an autoclave for 5 hours. From the violet solution produced the 4-anilido-1.9-anthrapyrimidone-2-sulphonic acid can be precipitated by means of caustic soda solution in blue needles, which dye wool violet shades from an acid bath.

Similar products are obtained when replacing the anthrapyridone- or anthrapyrimidone derivatives mentioned in the examples by the corresponding quantities of their 5-, 5- or 7-chloro- or bromo-derivatives, or their 5-hydroxy-, 6-methoxy- or 6-ethoxy derivatives, etc.

This is a continuation in part of my co-pending application Serial No. 642,327, filed November 11, 1932.

I claim:—

1. The process which comprises heating to a temperature of between about 130 and about 180° C. a neutral sulphite with a compound of the formula:—

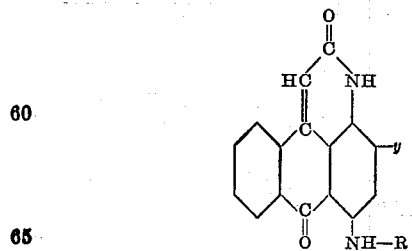

wherein $y$ means halogen, R stands for an alkyl-, phenyl-, benzyl- or hydroaryl group the latter being of the benzene and naphthalene series, in the presence of a solvent which is inert to the starting materials and capable of dissolving both of them.

2. The products having in their free form the formula:—

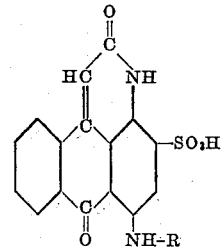

wherein R means an alkyl-, phenyl-, benzyl- or hydroaryl group the latter being of the benzene and naphthalene series, said products being red to bluish-red crystals, dyeing wool from an acid bath red to bluish red shades of good fastness properties.

3. The process which comprises heating a neutral sulphite with a compound of the formula:

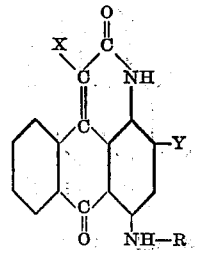

wherein Y means halogen, X stands for hydrogen or —COOR$_1$ (R$_1$=alkyl) and R stands for an alkyl, phenyl, benzyl or hydroaryl group, the latter being of the benzene and naphthalene series, in the presence of a solvent which is inert to the starting materials and capable of dissolving both of them.

4. The process which comprises heating to a temperature of between about 130 and about 180° C. a neutral sulphite with a compound of the formula:

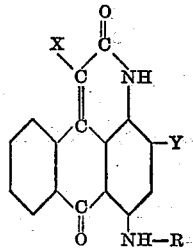

wherein Y means halogen, X stands for hydrogen or —COOR$_1$ (R$_1$=alkyl) and R stands for an alkyl, phenyl, benzyl or hydroaryl group, the latter being of the benzene and naphthalene series, in the presence of a solvent which is inert to the starting materials and capable of dissolving both of them.

KLAUS WEINAND.